(12) United States Patent
Bonnefoy et al.

(10) Patent No.: US 12,187,590 B2
(45) Date of Patent: Jan. 7, 2025

(54) AERIAL LIFT WITH AUTOMATIC POSITIONING IN COMPACT TRANSPORTATION POSITION

(71) Applicant: HAULOTTE GROUP, L'Horme (FR)

(72) Inventors: Nicolas Bonnefoy, Saint-Chamond (FR); Jean-Baptiste Doray, Chasse-sur-Rhône (FR)

(73) Assignee: HAULOTTE GROUP, L'Horme (FR)

( * ) Notice: Subject to any disclaimer, the term of this patent is extended or adjusted under 35 U.S.C. 154(b) by 544 days.

(21) Appl. No.: 16/621,091

(22) PCT Filed: May 31, 2018

(86) PCT No.: PCT/FR2018/051258
§ 371 (c)(1),
(2) Date: Dec. 10, 2019

(87) PCT Pub. No.: WO2018/229381
PCT Pub. Date: Dec. 20, 2018

(65) Prior Publication Data
US 2020/0207600 A1   Jul. 2, 2020

(30) Foreign Application Priority Data

Jun. 12, 2017 (FR) ..................................... 1755204

(51) Int. Cl.
*B66F 17/00* (2006.01)
*B66F 11/04* (2006.01)
(Continued)

(52) U.S. Cl.
CPC .......... *B66F 17/006* (2013.01); *B66F 11/046* (2013.01); *G01S 15/08* (2013.01); *G01S 17/08* (2013.01)

(58) Field of Classification Search
CPC ...... B66F 17/006; B66F 17/00; B66F 17/003; B66F 11/046; B66F 11/044; G01S 15/08;
(Continued)

(56) References Cited

U.S. PATENT DOCUMENTS

| 4,623,032 A | 11/1986 | Kemmer |
| 4,754,840 A | 7/1988 | MacDonald et al. |

(Continued)

FOREIGN PATENT DOCUMENTS

| CN | 102849659 A | 1/2013 |
| CN | 206108836 U | 4/2017 |

(Continued)

*Primary Examiner* — Daniel P Cahn
*Assistant Examiner* — Shiref M Mekhaeil

(57) ABSTRACT

The aerial work platform comprises a chassis 2, a work platform 10 and a lifting structure 20 that comprises at least one boom 26 able to be raised and lowered and a pendular arm 30 mounted at the top end of the boom 26 and supporting the platform 10. It also comprises sensors 51, 52 for detecting the proximity of the platform 10 to an obstacle. On-board electronics automatically puts the aerial work platform in a compact position on request by an operator by controlling the lifting structure 20 according to the signals from the sensors 51, 52 in order to take account of the surroundings. In the compact position, the aerial work platform is suitable for transport on a trailer or flatbed lorry. This avoids the transporter having himself to control the various movements of the lifting structure 20 in order to bring the aerial work platform into the compact transportation position.

18 Claims, 16 Drawing Sheets

(51) Int. Cl.
*G01S 15/08* (2006.01)
*G01S 17/08* (2006.01)

(58) Field of Classification Search
CPC ... G01S 15/42; G01S 4617/08; G01S 4617/46
See application file for complete search history.

(56) References Cited

U.S. PATENT DOCUMENTS

| | | | | |
|---|---|---|---|---|
| 6,380,849 | B1* | 4/2002 | Eckstine | G01S 13/931 |
| | | | | 340/436 |
| 6,405,114 | B1* | 6/2002 | Priestley | B66F 11/046 |
| | | | | 701/50 |
| 11,697,209 | B1* | 7/2023 | Mourlam | B25J 13/088 |
| | | | | 700/255 |
| 2012/0211301 | A1 | 8/2012 | Clark et al. | |
| 2014/0246270 | A1* | 9/2014 | Parot | B66F 11/044 |
| | | | | 182/63.1 |
| 2015/0259185 | A1 | 9/2015 | Ditty | |
| 2015/0330146 | A1* | 11/2015 | Kraemer | E06C 5/38 |
| | | | | 182/18 |
| 2016/0214843 | A1* | 7/2016 | Parot | B66F 11/044 |
| 2018/0251354 | A1* | 9/2018 | Mohlman | B66F 7/0666 |
| 2018/0362313 | A1* | 12/2018 | Bonnefoy | B66F 17/006 |
| 2019/0119090 | A1* | 4/2019 | Maisonnette | B66F 11/042 |
| 2020/0095105 | A1* | 3/2020 | Yutzy | B66F 17/006 |
| 2020/0140239 | A1* | 5/2020 | Schoonmaker | H04N 23/54 |
| 2020/0264307 | A1* | 8/2020 | Mah | G01S 17/04 |
| 2022/0227614 | A1* | 7/2022 | Yutzy | B66F 11/046 |

FOREIGN PATENT DOCUMENTS

| | | |
|---|---|---|
| DE | 9214241 U1 | 1/1993 |
| DE | 19836743 A | 2/2000 |
| EP | 0367034 A | 5/1990 |
| EP | 1038823 A | 9/2000 |
| WO | 0168507 A | 9/2001 |

* cited by examiner

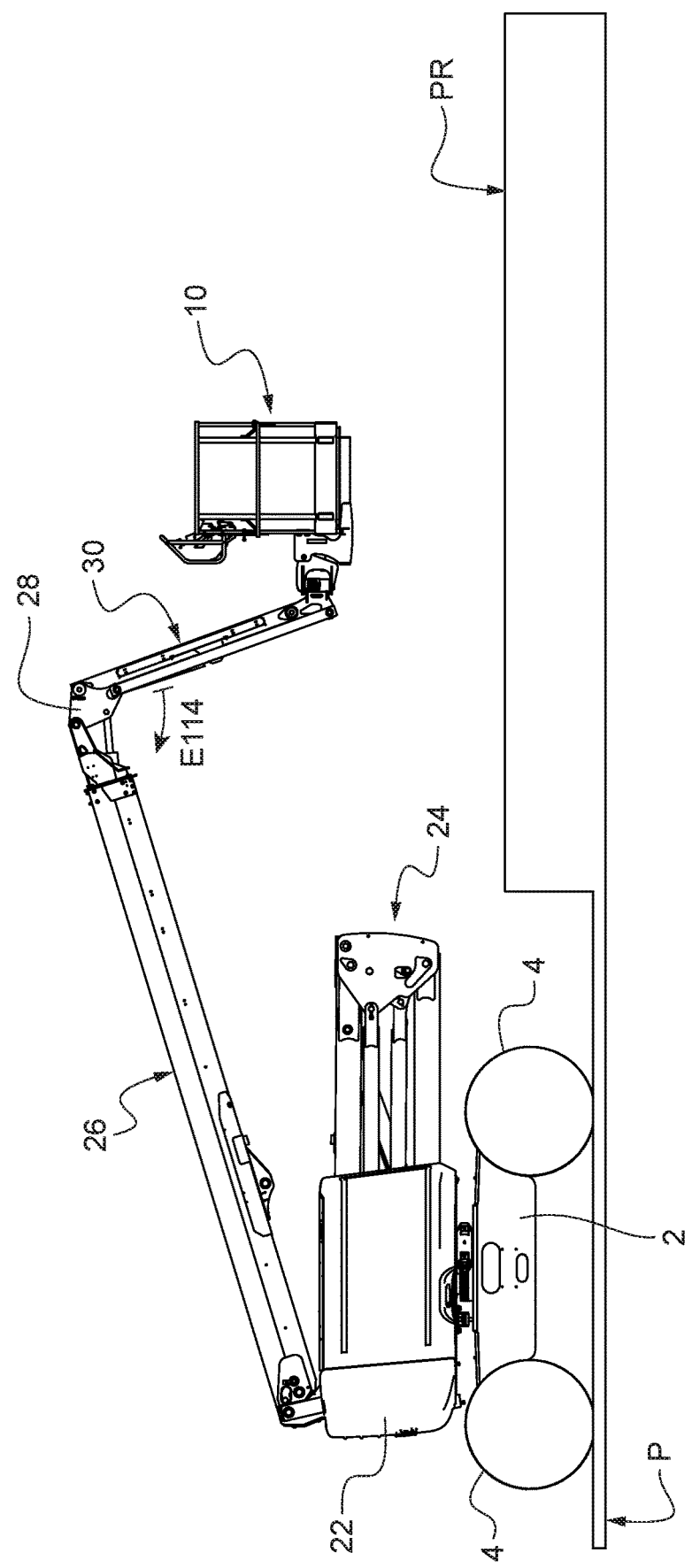

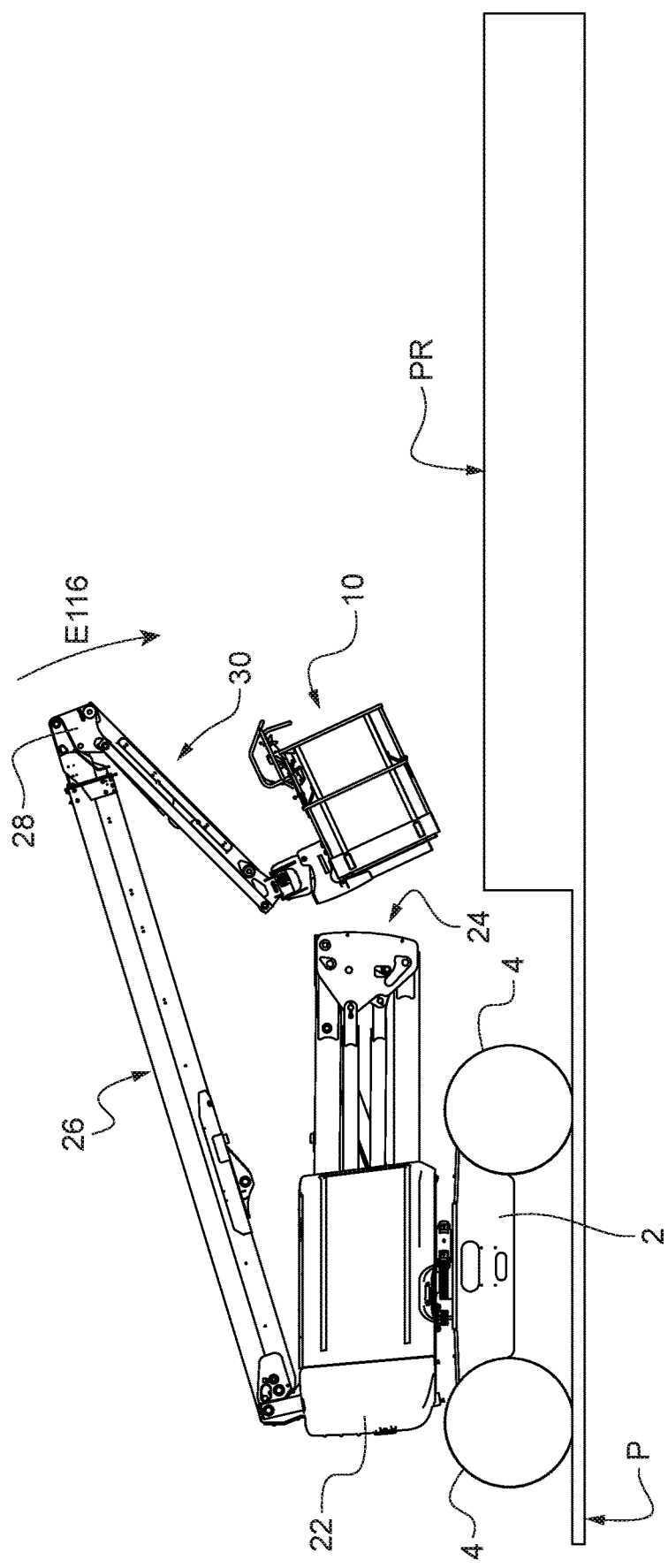

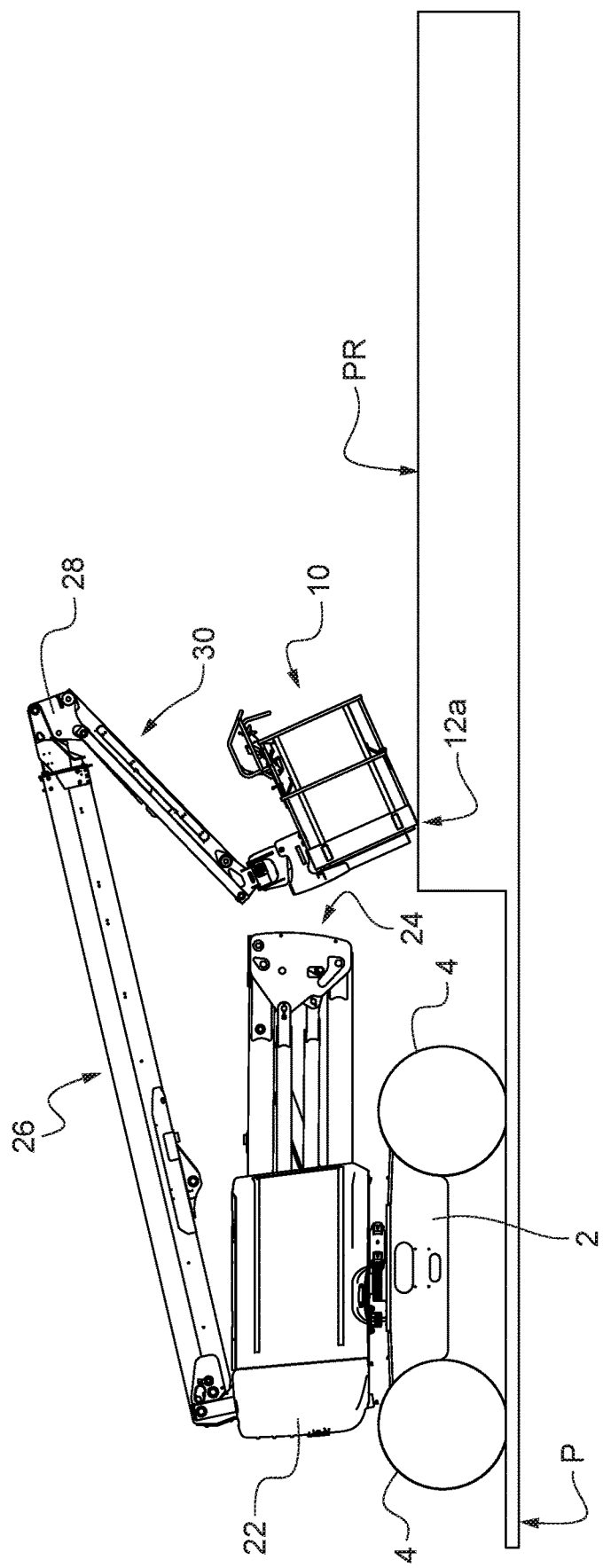

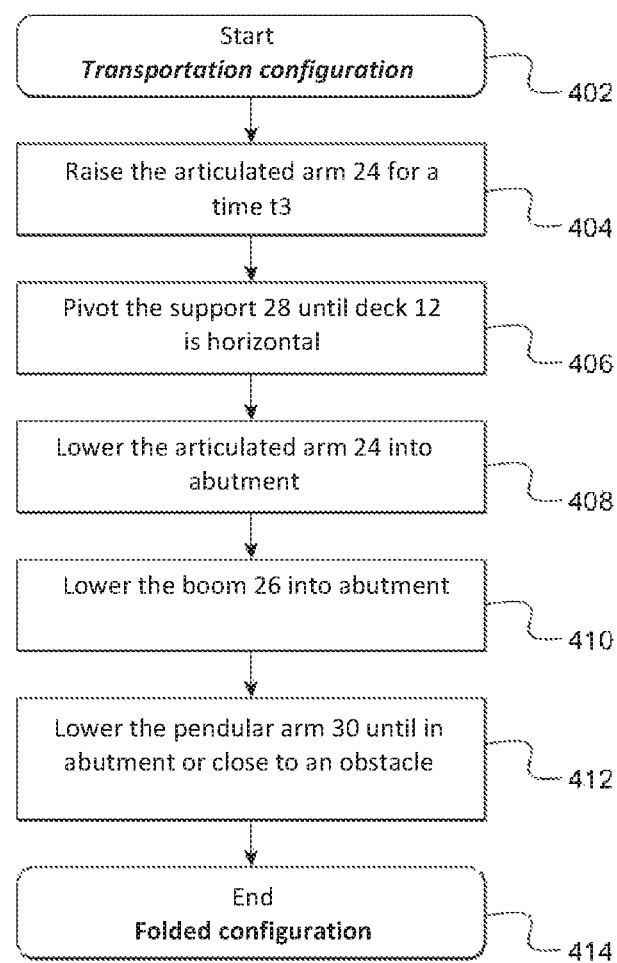

AERIAL LIFT WITH AUTOMATIC POSITIONING IN COMPACT TRANSPORTATION POSITION

CROSS-REFERENCE TO RELATED APPLICATIONS

The present application is a U.S. national stage of International Application No. PCT/FR2018/05128 filed May 31, 2018, which claims priority to French Patent Application No. 1755204 filed Jun. 12, 2017.

The aforementioned patent applications are hereby incorporated by reference in their entirety.

BACKGROUND OF THE INVENTION

Field of the Invention

The present invent ion relates to the field of mobile elevating work platforms for personnel (also designated by the acronym MEWPs), also commonly referred to as aerial work platforms.

It relates more particularly to an aerial work platform able to be transported on a trailer or flatbed lorry and comprising a chassis provided with members for translation on the ground, a work platform and a lifting structure arranged on the chassis, said lifting structure comprising a boom able to be raised and lowered by modifying the inclination thereof with respect to the chassis, and a pendular arm mounted by a first end on the top end of the boom so as to be able to be raised and lowered with respect to the boom by pivoting, the pendular arm supporting the work platform at a second end, which is at the side opposite to the first end thereof. The work platform generally comprises a control console enabling the operator to control the lifting structure, or even also the translation of the aerial work platform on the ground.

Brief Description of the Related Art

A lifting structure often comprises other possibilities of movements. Frequently it comprises a turret mounted so as to pivot on the chassis, the boom is telescopic, and the work platform is mounted so as to pivot about a vertical axis with respect to the pendular arm. According to one category of aerial work platform, the boom is mounted on the chassis by means of an articulated arm of the pantograph type supporting the boom at its top end.

One difficulty posed by this type of aerial work platform relates to the transport thereof on a trailer or flatbed lorry used for bringing them to a site or for returning them to their depot. Transport thereof requires that they be put in a compact position in which the length thereof is limited and the height thereof compatible with the transport. Often the pendular arm and the platform are folded under the boom, the work platform being inclined so that the deck thereof is oriented towards the ground.

The operation of putting the aerial work platform in the compact transportation position is performed from a control station arranged on the chassis or the turret. It generally requires performing operations of controlling the various parts of the lifting structure in a precise order. The operation is performed by the transporter, who is not the user of the lift on the site, whereas it is complex and varies from one aerial work platform to another, and the transporter does not have knowledge of the particularities of each model. In addition, the compact transportation position must be suited to the configuration of the trailer, such as the raised deck part at the front of a gooseneck semitrailer or the platform, which comprises other equipment forming an obstacle to the folding of the lifting structure of the aerial work platform.

In addition, in order to achieve the compact positioning, the operator is situated on the edge of the platform of the trailer or lorry and must simultaneously press on two buttons on the control panel on the chassis or turret of the aerial work platform in order on each occasion to cause the required movement of the lifting structure, namely a so-called dead man's button and the button corresponding to the required movement. The drawback of this position is that it provides poor visibility for the operator, and there also exists a risk of the operator falling. The latter drawback is overcome with some aerial work platforms—such as those sold by the applicant under the reference H28TJ—by adding to them a cabled remote control dedicated to the transportation positioning, which makes it possible to move away from the aerial work platform in order to control the sequences of movements. This solution does however leave the difficulties mentioned above.

SUMMARY OF THE INVENTION

The aim of the present invention is to at least partially overcome the aforementioned drawbacks. According to one aspect, the invention aims more particularly to facilitate the putting of the aerial work platform in the compact transportation position.

For this purpose, the present invention proposes an aerial work platform able to be transported on a trailer or flatbed lorry, comprising:
  a chassis provided with members for translation on the ground,
  a work platform comprising a deck and a guardrail,
  a lifting structure arranged on the chassis and comprising:
    a boom able to be raised and lowered by modifying the inclination thereof with respect to the chassis,
    a pendular arm mounted by a first end on the top end of the boom so as to be able to be raised and lowered with respect to the boom by pivoting, the pendular arm supporting the work platform at a second end, which is on the side opposite to its first end,
  an obstacle detection system for detecting the proximity of the platform to an obstacle; and
  on-board electronics designed to automatically put the aerial work platform in a compact position at the request of an operator, the on-board electronics controlling the lifting structure according to the detection information supplied by the obstacle detection system so as to automatically bring the aerial work platform, taking account of the surroundings of the aerial work platform, into a compact position in which the aerial work platform is suitable for transport on a trailer or flatbed lorry.

According to preferred embodiments, the invention comprises one or more of the following features:
  the obstacle detection system comprises at least one proximity sensor, preferably two, for detecting the proximity both of an obstacle under the deck of the platform and of an obstacle in front of the front side of the platform that is opposite to the pendular arm;
  the on-board electronics is designed to control the lifting structure so that, in the compact position, the pendular arm is folded under the boom and the deck of the platform is inclined with respect to the horizontal so that the bottom front edge of the platform is directed towards the ground and in contact therewith, the on-board electronics being designed to bring the front edge of the deck in contact with the ground by maximising the lowering of the top end of the boom;

the boom is telescopic, the on-board electronics being designed to control the lifting structure so that, in the compact position, the boom is completely retracted;

the platform is able to be pivoted about a vertical axis with respect to the pendular arm, the on-board electronics being designed to control the lifting structure so that, in the compact position, the platform is centred with respect to the pendular arm;

the boom is mounted on the chassis by means of an articulated arm supporting at its top end the boom, wherein:
  the boom is able to be raised and lowered by modifying its inclination with respect to the articulated arm, and
  the top end of the articulated arm is able to be raised and lowered vertically by respectively unfolding and folding the articulated arm,
  the on-board electronics being designed to control the lifting structure so that, in the compact position, the articulated arm is completely lowered;

during the putting in the compact position, the on-board electronics is designed to control the lifting structure so as to raise the top end of the boom in the event of detection of an obstacle in the vicinity of the platform by the obstacle detection system;

when putting in the compact position, the on-board electronics is designed to raise the boom in the event of detection of an obstacle in the vicinity of the platform by the obstacle detection system;

the on-board electronics is designed to raise the boom for a predetermined period in the event of detection of an obstacle;

the on-board electronics is also designed to stop the current movement or movements of the lifting structure when an obstacle is detected in the vicinity of the platform, and then to continue the current movement or movements after having raised the boom if the obstacle detection system has ceased to detect an obstacle in the vicinity of the platform;

in a particularly preferred embodiment, the pendular arm is mounted at the top end of the boom by means of a support, the pendular arm being mounted by its first end on the support so as to be able to be raised and lowered by pivoting with respect to the support and the support being mounted so as to pivot about a horizontal axis at the top end of the boom, the support forming part of a system for keeping the platform level in order to keep the deck of the platform substantially horizontal by pivoting the support in the event of modification of the inclination of the boom with respect to the chassis when the aerial work platform is in use, and the on-board electronics is designed to be able to control the pivoting of the support of the system for keeping the platform level, the system for keeping the platform level being designed to pivot the support in correlation with the modification of the inclination of the boom autonomously with respect to the control of the pivoting of the support by the on-board electronics, and the on-board electronics is designed to automatically bring the aerial work platform into the compact position in two successive phases:
  a first phase in which the on-board electronics controls the lifting structure so as to ensure, at the end of the first phase, that the lifting structure is in a configuration corresponding to the compact position of the aerial work platform, except with regard to the angle of inclination of the boom and optionally the angle of pivoting of the support of the system for keeping the platform level, and in that the bottom front edge of the platform is out of contact with the ground, and
  a second phase in which the on-board electronics controls the inclination of the boom, the pivoting of the support of the system for keeping the platform level and optionally the raising of the pendular arm with respect to the support so as, at the end of the second phase, to result in the compact position of the aerial work platform, wherein, at the end of the first phase, the pivoting angle of the support of the system for keeping the platform level is such that the pendular arm is folded under the boom and, during the second phase, the on-board electronics is designed to apply a sequence consisting of:
  i) lowering the boom, and
  ii) in the event of detection of an obstacle in the vicinity of the platform by the obstacle detection system, stopping lowering the boom and pivoting the support of the system for keeping the platform level in order to fold the pendular arm towards the boom, and then to continue to lower the boom if detection of the proximity of an obstacle has ceased, and, in the case where the boom has been lowered until it is in bottom abutment during said sequence, the on-board electronics applies an additional sequence for bringing the bottom front edge of the platform in contact with the ground by pivoting the support of the system for keeping the platform level so as to move the pendular arm away from the boom and/or by raising the pendular arm with respect to the support of the system for keeping the platform level;

the design of the lifting structure with regard to its possibilities of movement excludes any possibility of interference of the platform with another part of the aerial work platform, and the on-board electronics is designed so that, when it pivots the support of the system for keeping the platform level in step (ii) of said sequence of the second phase, it pivots it until it is in abutment, and/or the on-board electronics is designed to pivot the support of the system for keeping the platform level so as to be in abutment at the end of the first phase;

during the first phase, the on-board electronics is designed to control the lifting structure so as to raise the top end of the boom in the event of the detection of an obstacle in the vicinity of the platform by the obstacle detection system;

during the first phase, the on-board electronics is designed to raise the boom in the event of the detection of an obstacle in the vicinity of the platform by the obstacle detection system; preferably, the on-board electronics is designed to raise the boom for a predetermined time in the event of the detection of an obstacle; and advantageously the on-board electronics is furthermore designed to stop the current movement or movements of the lifting structure when an obstacle is detected in the vicinity of the platform, and then to continue the current movement or movements after having raised the boom if the obstacle detection system has ceased to detect an obstacle in the vicinity of the platform;

the on-board electronics is designed to check the absence of a load and/or a person on board the platform before automatically bringing the aerial work platform into the compact position, preferably by cooperating with a load measuring system present on the platform and/or a system for detecting the attachment of a harness for a person or persons on board the platform;

the on-board electronics is furthermore designed to automatically put the aerial work platform in a position of access to the platform from the compact position in which the aerial work platform was previously put automatically by the on-board electronics, in which access position the deck of the platform is substantially horizontal and at a distance from the ground enabling an operator on the ground to access the platform;

when the aerial work platform is put in the access position, the on-board electronics is designed to automatically apply a sequence comprising the following successive steps:

a) raising the top end of the boom, preferably by, for a predetermined time, lifting the articulated arm, or failing this, the boom;

b) pivoting the support of the system for keeping level until the deck of the platform is substantially horizontal by cooperating with a device for determining the horizontality of the deck;

c) completely lowering the boom and where applicable the articulated arm;

d) lowering the pendular arm with respect to the boom in the maximum lowered position or to a lowered level compatible with the surroundings in order to prevent interference of the platform with the surroundings, said lowering level being determined according to the detection information supplied by the obstacle detection system.

Other aspects, features and advantages of the invention will emerge from a reading of the following description of a preferred embodiment of the invention, given by way of example and with reference to the accompanying drawings.

BRIEF DESCRIPTION OF THE DRAWINGS

FIGS. 1 and 3 are side views of the aerial work platform respectively in the folded state and in the state deployed to the maximum while FIG. 2 is a plan view.

FIGS. 9 to 15 show side views of the aerial work platform illustrating various steps of the automatic placement in the compact transportation position by application of the logic diagram of FIGS. 6 to 8 for an example of surroundings and starting configuration of the aerial work platform.

FIG. 16 is a logic diagram of commands used by the on-board electronics of the aerial work platform for bringing it into a position ready for use from the compact transportation position in which the on-board electronics had previously placed it.

DETAILED DESCRIPTION OF THE PREFERRED EMBODIMENTS

Figure 1:
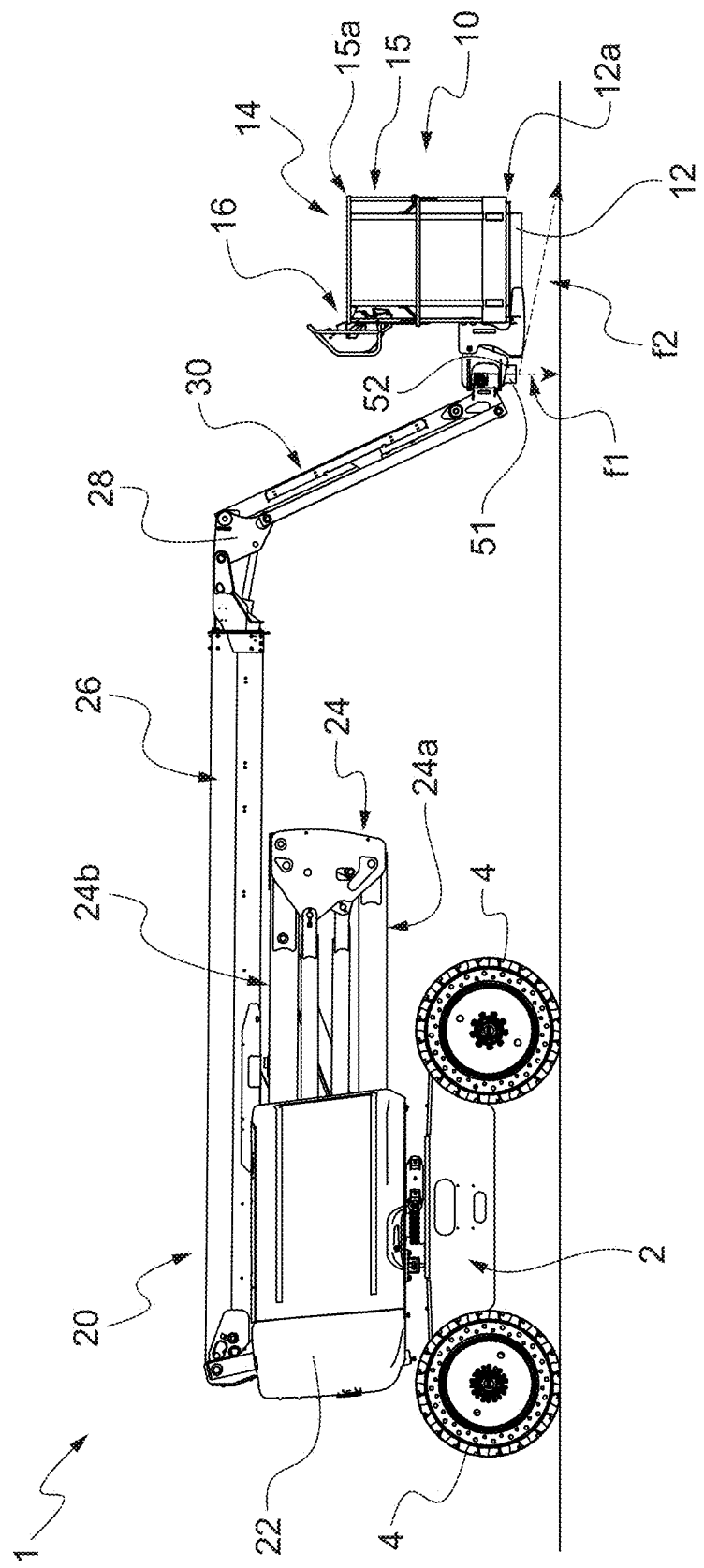
FIGS. 1 to 3 depict various views of the same aerial work platform according to an embodiment of the invention, which illustrate the various possibilities of movements of its lifting structure.

As can be seen in FIG. 1, the aerial lift assembly 1 or aerial work platform according to the embodiment detailed with reference to the figures comprises a chassis 2 equipped with wheels 4 for translation thereof on the ground, it being stated that at least two of the wheels 4 are preferably steered. Alternatively or in combination, the chassis 2 may be equipped with tracks for the same purposes. The chassis 2 is motorised in order to provide the autonomous movement of the aerial work platform on the ground.

The aerial work platform comprises a lifting structure 20 supporting a work platform 10 designed to receive personnel and equipment on board with a view to carrying out work at a height. The platform 10 comprises a deck 12 and a guardrail 14. A control console 16 is arranged on the platform 10. It enables an operator on board the platform to control the lifting structure in order to move the platform at a height to the required position, as well as to move the chassis 2 on the ground.

The lifting structure 20 comprises a turret 22 mounted on the chassis 2, an articulated arm 24 mounted on the turret 22, a boom 26 mounted at the top end of the articulated arm 24 and a pendular arm 30 mounted by one end at the top end of the boom 26 while the other end of the pendular arm 30 supports the platform 10.

The turret 22 is mounted so as to pivot about a vertical axis on the chassis 2, which makes it possible to modify the orientation of the rest of the lifting structure 20 and of the platform 10 with respect to the chassis 2. This possibility of rotation of the turret 22 is illustrated by the arrow F1 in FIG. 2, in which the turret 22 has been turned compared with FIG. 1, where it is aligned with the chassis 2.

Figure 3:
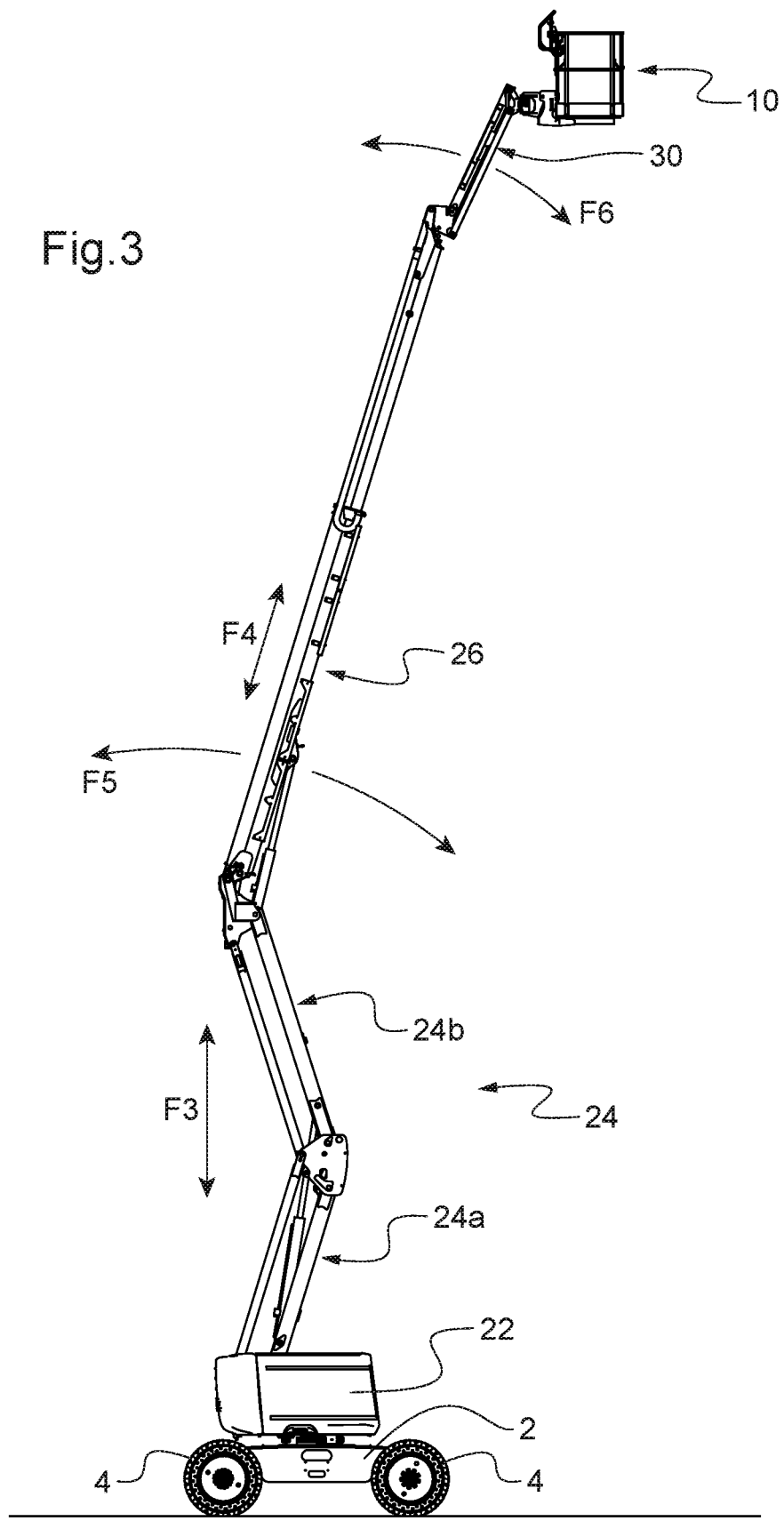

As can be seen better in FIG. 3, the articulated arm 24 comprises two parallelograms 24a and 24b arranged so as to form a pantograph. Because of this, the top end thereof is able to be raised and lowered vertically by unfolding and folding respectively of the articulated arm 24 with respect to the turret 22: cf. this possibility of movement illustrated by the arrow F3. It thus makes it possible to raise and lower again the boom 26 without angular modification of the boom 26 with respect to the chassis 2.

The boom 26 is mounted so as to pivot at the top end of the articulated arm 24 in order to be raised and lowered by modifying its inclination with respect to the articulated arm 24: cf. the arrow F5 illustrating this pivoting movement in FIG. 3. Moreover, the boom 26 is telescopic, which makes it possible to extend or shorten it: cf. arrow F4.

The pendular arm 30 is mounted at the top end of the boom 26 so as to be able to be raised and lowered with respect to the boom 26 by pivoting: cf. the arrow F6 in FIG. 3. The pendular arm 30, which is shorter than the boom 26, makes it possible to adapt the elevation height of the platform 10 locally without acting on the boom 26.

The pendular arm 30 has a deformable parallelogram structure under the action of a jack, which makes it possible to keep the angle of inclination of the platform 10 constant with respect to the horizontal—and more particularly to keep it horizontal when the aerial work platform is in use—when the pendular arm 30 is raised or lowered.

Figure 2:
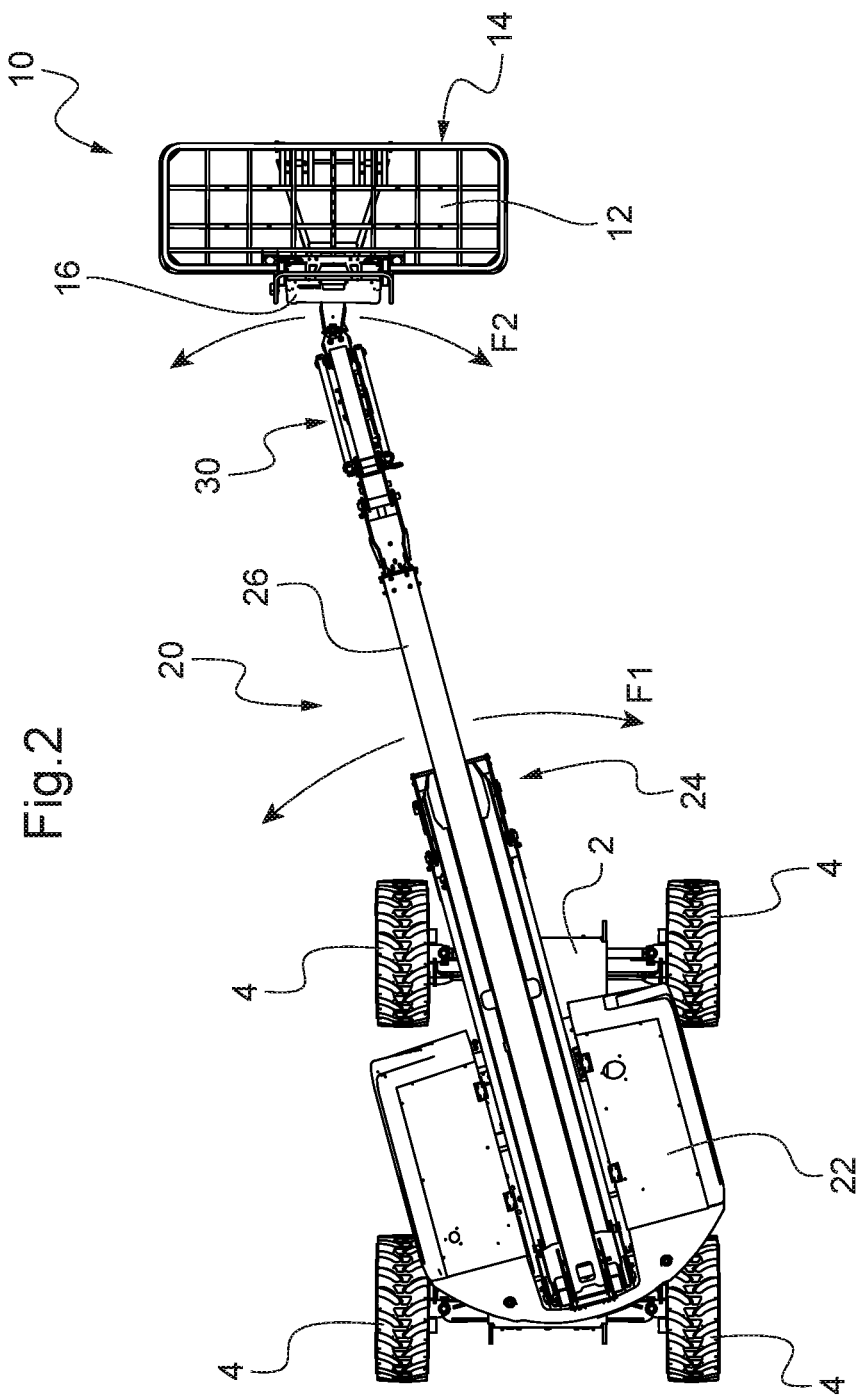

The platform 10 is mounted so as to be able to pivot with respect to the pendular arm 30 about an axis extending vertically when the aerial work platform is in use, that is to say when the deck 12 of the platform is horizontal: cf. the arrow F2 in FIG. 2, in which the platform 10 is shown pivoted by a certain angle with respect to the pendular arm 30 while it is aligned with it in FIGS. 1 and 3.

The aerial work platform comprises actuators allocated to each of the aforementioned movements, which can be controlled from the control console 16. More particularly, it may conventionally be a case of hydraulic actuators and in particular hydraulic jacks with regard to the lifting and lowering movements previously described for the articulated arm 24, the boom 26 and the pendular arm 30, as well as the extension movement of the boom 26 and the pivoting movement of the platform 10 with respect to the pendular arm 30.

Figure 4:
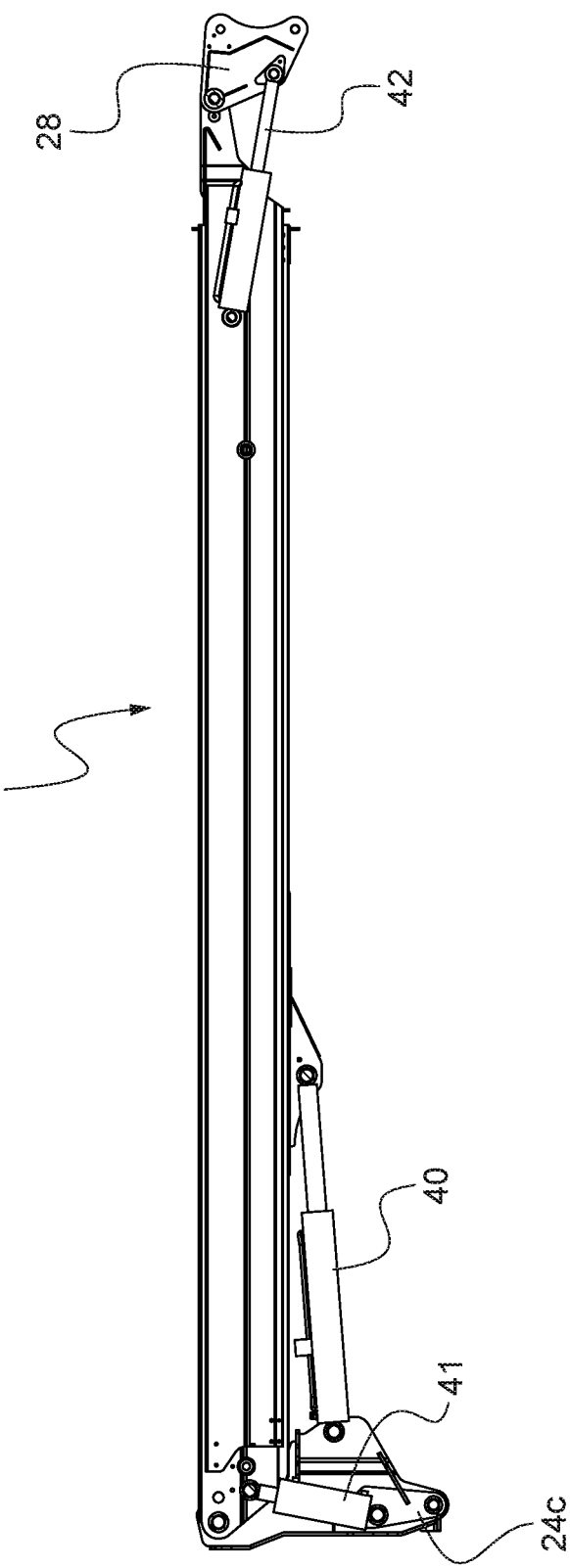
FIG. 4 is a local view of the boom of the aerial work platform that illustrates the system for keeping its platform level.

The aerial work platform also comprises a system for keeping the platform 10 level, which is illustrated in FIG. 4. As already mentioned, a hydraulic jack, referenced 40, makes it possible to lower or raise the boom 26 with respect to the articulated arm 24. For this purpose, the jack 40 is interposed between a connecting support 24c and the boom 26, the connecting support 24c forming part of the articulated arm 24 and the boom 26 being mounted so as to pivot on the connecting support 24c. When the aerial work platform is in use, the function of the system for keeping the platform level is to keep the deck 12 of the platform 10 substantially horizontal when the inclination of the boom 26 is modified.

In this case, the system for keeping the platform 10 level is a system with two hydraulic jacks 41, 42 arranged in master/slave mode. The master jack 41 is connected between the connecting support 24c and the boom 26. At the top end of the boom 26, the pendular arm 30 is mounted on the boom 26 by means of a connecting support 28 mounted so as to pivot about a horizontal axis at the top end of the boom 26. The slave jack 42 is mounted between the boom 26 and the connecting support 28. The jacks 41, 42 are inserted in a closed hydraulic circuit so that, in the event of variation in the inclination of the boom 26, any hydraulic fluid driven from or aspirated into the master jack 41 is respectively aspirated into or driven from the slave jack 42. This has the effect of correspondingly varying the angle of the pendular arm 30 with respect to the boom 26 and thereby keeping the deck 12 of the platform 10 substantially horizontal. This type of master/slave system for keeping the platform 10 level is known per se and is exemplified in particular in U.S. Pat. No. 4,754,840.

In a variant, the system for keeping level may be based on a system other than of the master/slave type, in particular by omitting the jack 41 and controlling the length of extension of the single jack 42 by on-board electronics of the aerial work platform according to a sensor determining the angle of inclination of the boom 26 with respect to the chassis 2. This type of system for keeping the platform 10 level is also known per se, for example being provided by US 2012/0211301 A1.

Hereinafter, we are going to describe the method used by the on-board electronics of the aerial work platform for automatically placing the aerial work platform in a compact position of transportation on a trailer or flatbed lorry.

Figure 5:
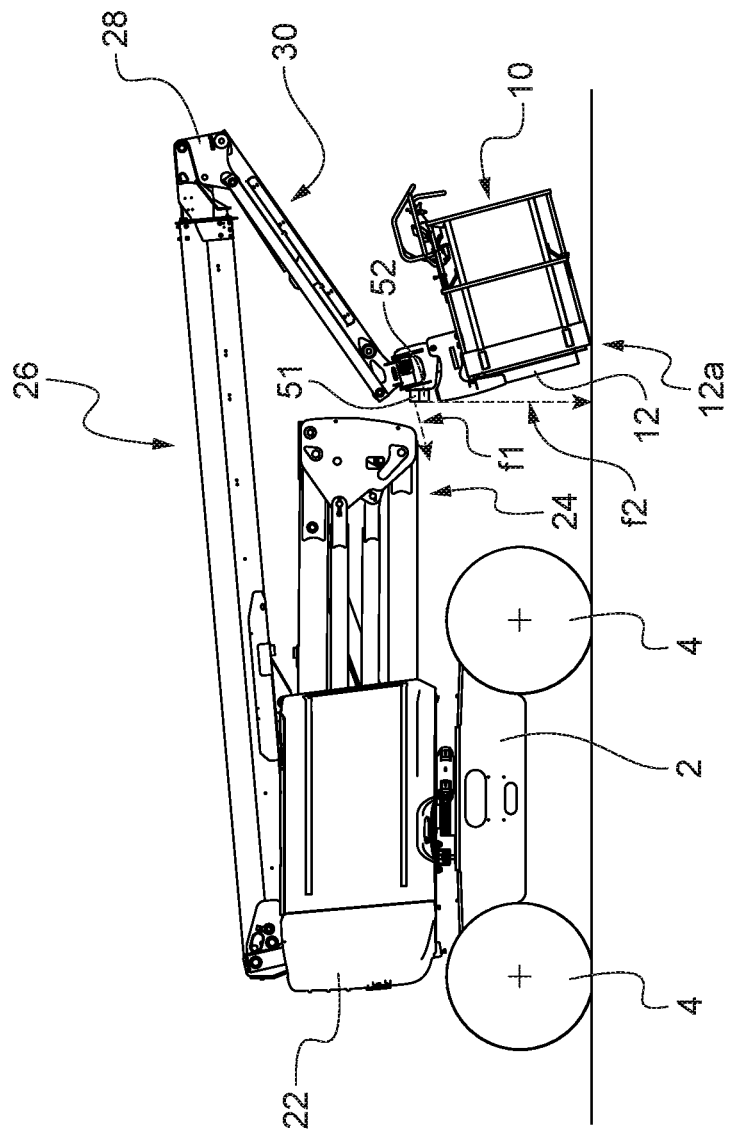
FIG. 5 shows a side view of the same aerial work platform but put in a compact position for transportation on a flatbed trailer.

FIG. 1 illustrates a folded position of the aerial work platform in which the deck 10 of the platform 10 is horizontal and at a low height from the ground. The aerial work platform is generally put in this position to allow access of persons on board the platform 10 from the ground or on the other hand to leave it. However, the aerial work platform is generally not transported on a trailer or flatbed lorry in such a configuration since the space requirement in terms of length remains great. FIG. 5 illustrates the compact position in which the aerial work platform is generally placed for transporting it. As can be seen, the pendular arm 30 is lowered under the boom 26 and the deck 12 is oriented towards the ground, the bottom front edge 12a of the platform 10 being in contact with the ground. However, the compact transportation position is not predefined since it can be adapted to the surroundings on the trailer or flatbed lorry, in particular in the event of any difference in level of the bed for example at a gooseneck of a trailer.

To allow the automatic placement of the aerial work platform in the compact transportation position, the aerial work platform is provided with an obstacle detection system for detecting the proximity of the platform 10 to an obstacle.

In this embodiment, there are two proximity sensors 51, 52 arranged on the underneath of a piece connecting the deck 12 of the platform 10 to the pendular arm 30: cf. FIG. 1. The proximity sensors 51 and 52 are preferably ultrasound or photoelectric sensors and may be of any suitable type existing on the market. The detection beams—represented by the arrows f1 and f2—of the sensors 51, 52 are oriented transversely with respect to one another in order to detect an obstacle both on the deck 12 and in front of the bottom front edge 12a of the platform 10. For convenience, the sensors 51, 52 and the arrows f1, f2 have been shown only in FIGS. 1 and 5. In this case, the detection beam f1 of the sensor 51 is oriented perpendicular to the deck 12 downwards, that is to say towards the ground when the deck 12 is horizontal. The detection beam f2 of the sensor 52 extends obliquely under the deck 12 in the direction of the bottom front edge 12a while passing under it so as to detect an obstacle in front of the bottom front edge 12.

The position and number of the proximity sensors may be changed in particular according to the configuration of the platform 10 and of the lifting structure 20. In particular, in order to reduce costs in the case of an aerial work platform equipped with a small platform 10, the sensor 51 may be omitted, the sensor 52 then being used alone for detecting an obstacle both under the deck 12 and in front of the bottom front edge 12a. If on the other hand the aerial work platform is equipped with a large platform, it is possible to add a plurality of sensors in order to increase the obstacle detection zone. More generally, it is possible to provide one or more additional proximity sensors for detecting obstacles in front of the front face 15 of the platform 10 at a level higher than the bottom front edge 12a, in other words for detecting an obstacle in front of the guardrail 14, for example in front of the top front edge 15a of the guardrail 14, and/or at a level intermediate between the bottom front edge 12a and the top front edge 15a. In this case, the additional sensor or sensors may be mounted on the front face 15 of the guardrail 14.

The on-board electronics of the aerial work platform is designed to automatically put the aerial work platform in the compact transportation position on request from an operator, by controlling the lifting structure according to the detection information supplied by the obstacle detection system.

Figure 6:
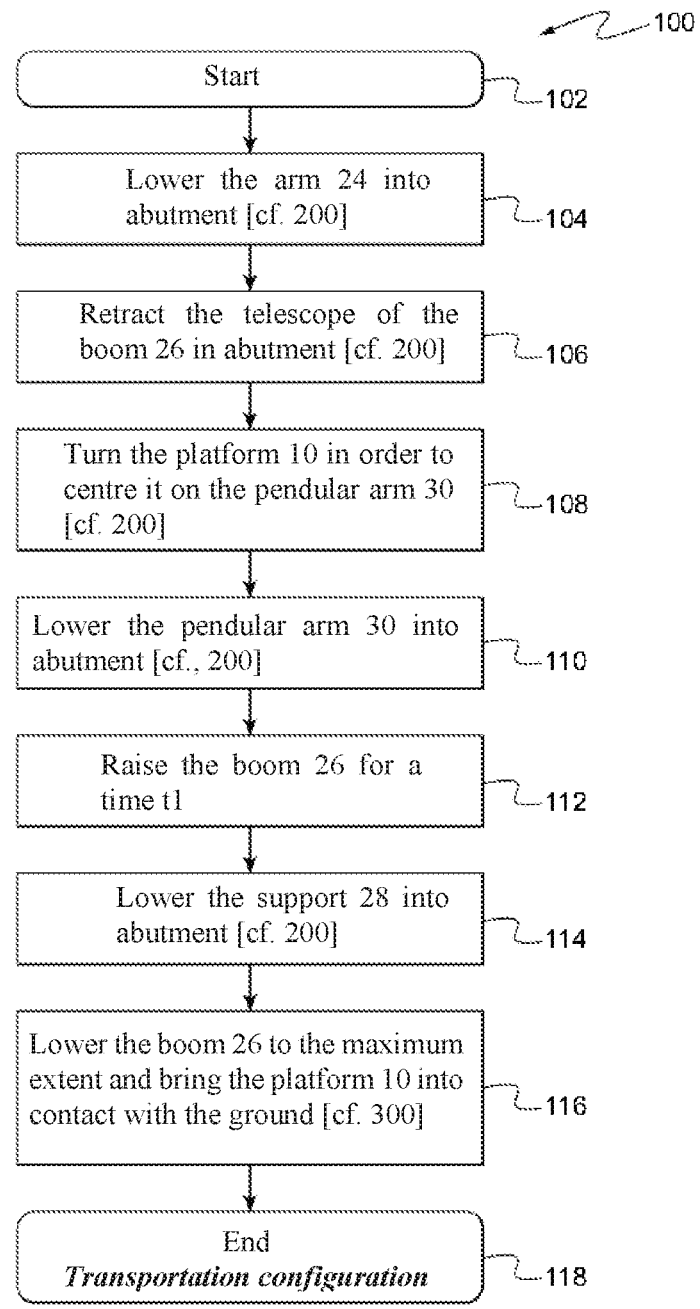
FIGS. 6 to 8 illustrate the flow diagram of commands used by the on-board electronics of this aerial work platform for bringing it automatically into the compact transportation position.
Figure 7:
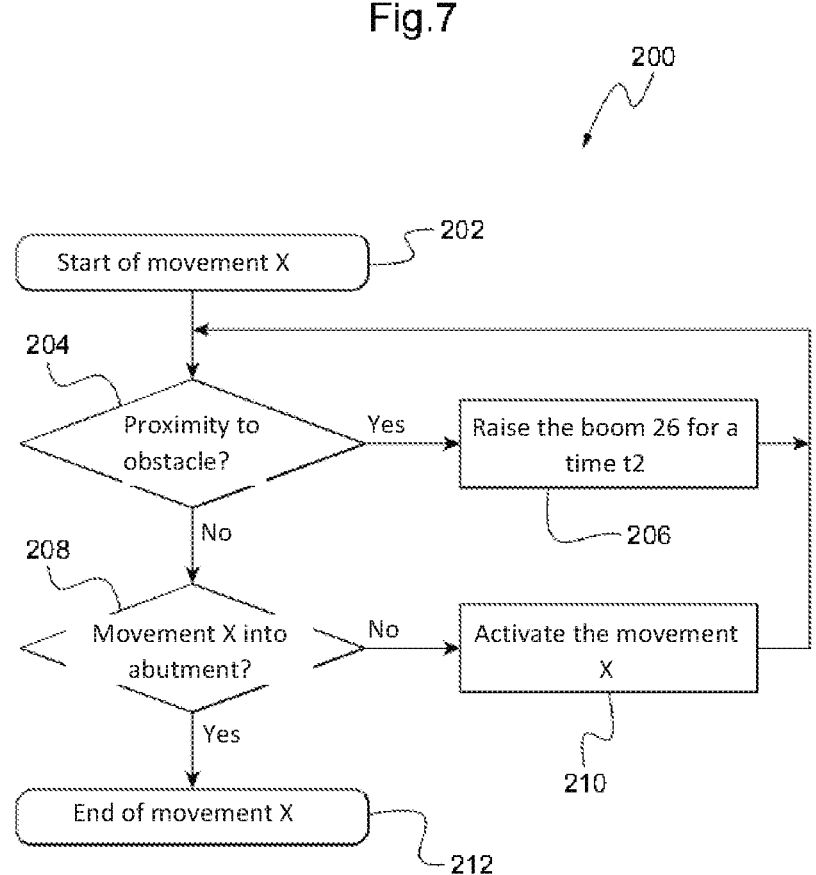
Figure 8:
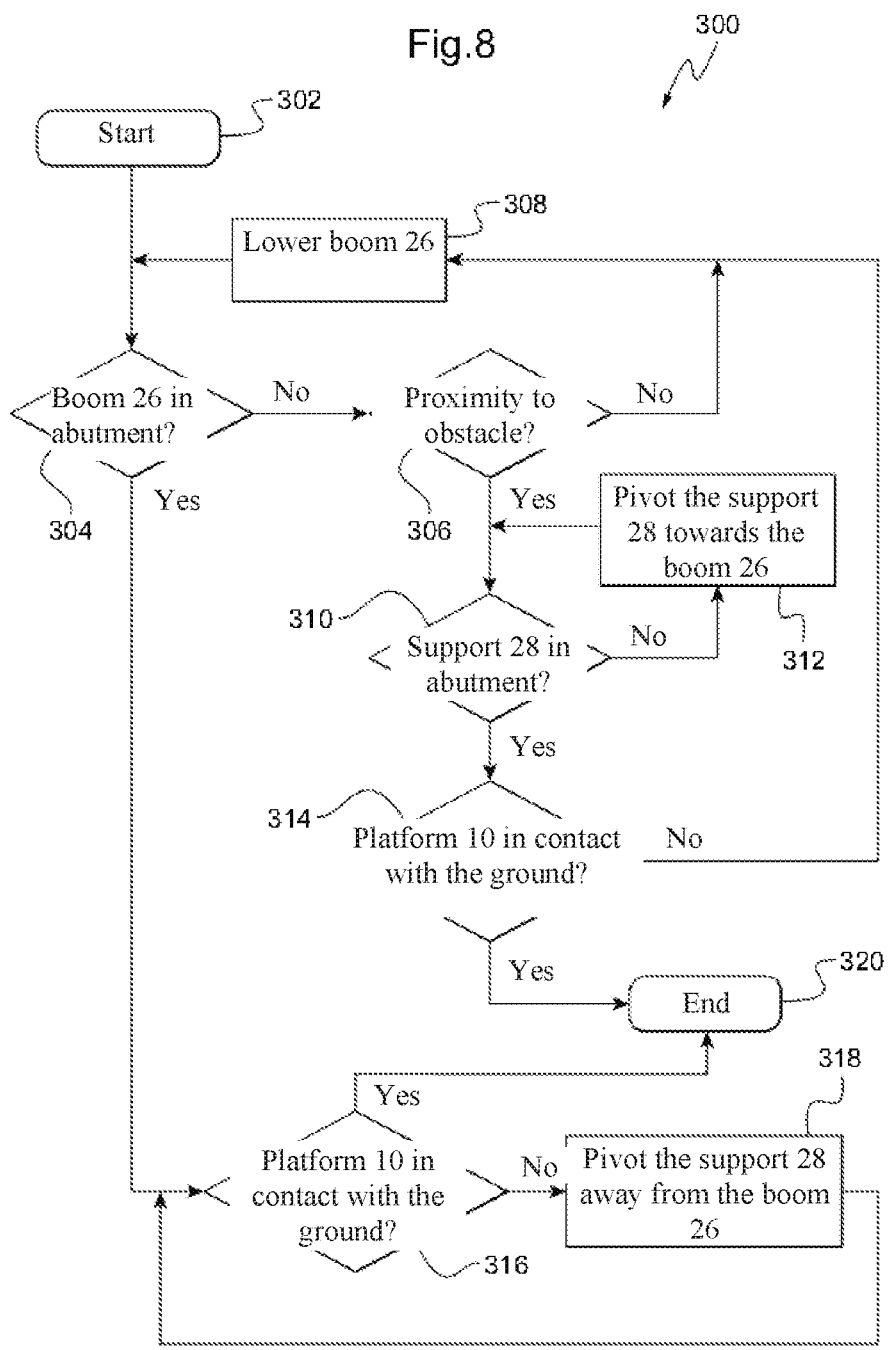

FIGS. 6 to 8 illustrate the control logic diagram used by the on-board electronics in accordance with one embodiment while FIGS. 9 to 15 illustrate various configurations adopted by the aerial work platform when it is being used for an example of starting configuration and a platform P of a gooseneck trailer. The platform P of the trailer is shown only schematically in a very simplified manner.

More particularly, the logic diagram 100 of FIG. 6 is the general logic diagram used while the logic diagrams 200 and 300 explain in more detail the steps implemented for certain steps of the logic diagram 100.

At the start—cf. box 102—the aerial work platform, or more particularly the lifting structure 20 thereof, may be in any configuration.

It is preferable, prior to the execution of the logic diagram 100, for the on-board electronics to check the absence of a load and/or persons on board the platform 10. The on-board electronics may carry out this check on the basis of the information supplied by a load measuring system present on the platform 10 and/or a system for detecting the attachment of a harness for a person or persons on board the platform 10.

In the absence of a load or a person detected on board the platform 10, the on-board electronics successively executes step 104 consisting of lowering the articulated arm 24 until it is in abutment, and then step 106 consisting of retracting the telescopic part of the boom 26 until it is in abutment, and then step 108 consisting of pivoting the platform 10 in order to centre it with respect to the pendular arm 30, and then step 110 consisting of lowering the pendular arm 30 with respect to the support 28 until it is in abutment.

Each of these steps is performed by executing the sequence in the logic diagram 200 in which the movement X corresponds to that of the step concerned in the logic diagram 100.

Thus, in order to perform any of steps 102 to 110, the on-board electronics checks in real time whether the obstacle detection system is detecting the proximity of the platform 10 to an obstacle: cf. step 204. If the obstacle detection system does not detect any obstacle in the vicinity of the platform 10, the on-board electronics actuates the relevant movement as long as it is not in abutment: cf. steps 208 and 210. When the movement concerned arrives in abutment, the on-board electronics stops the actuator corresponding to the movement: cf. step 212.

If at step 204 the obstacle detection system detects the proximity of the platform 10 to an obstacle, the on-board electronics preferably stops the movement concerned and raises the boom 26, preferably for a predetermined time t2: cf. step 206. The purpose of the raising of the boom 26 is to move the platform 10 away from the obstacle. The predetermined time t2 is preferably chosen from 2 to 3 seconds in order to limit the raising of the boom 26, it being stated that such a period corresponds to a lifting angle of approximately 2° to 3°. Then the on-board electronics once again checks whether the platform 10 is sufficiently far away from the obstacle by applying step 204. If such is the case, the on-board electronics continues the movement concerned as before: cf. steps 208, 210 and 212. In the contrary case, the on-board electronics raises the boom 26 further and once again goes to step 204.

An implementation of steps 102 to 110 is illustrated by FIGS. 9 to 12.

Figure 9:
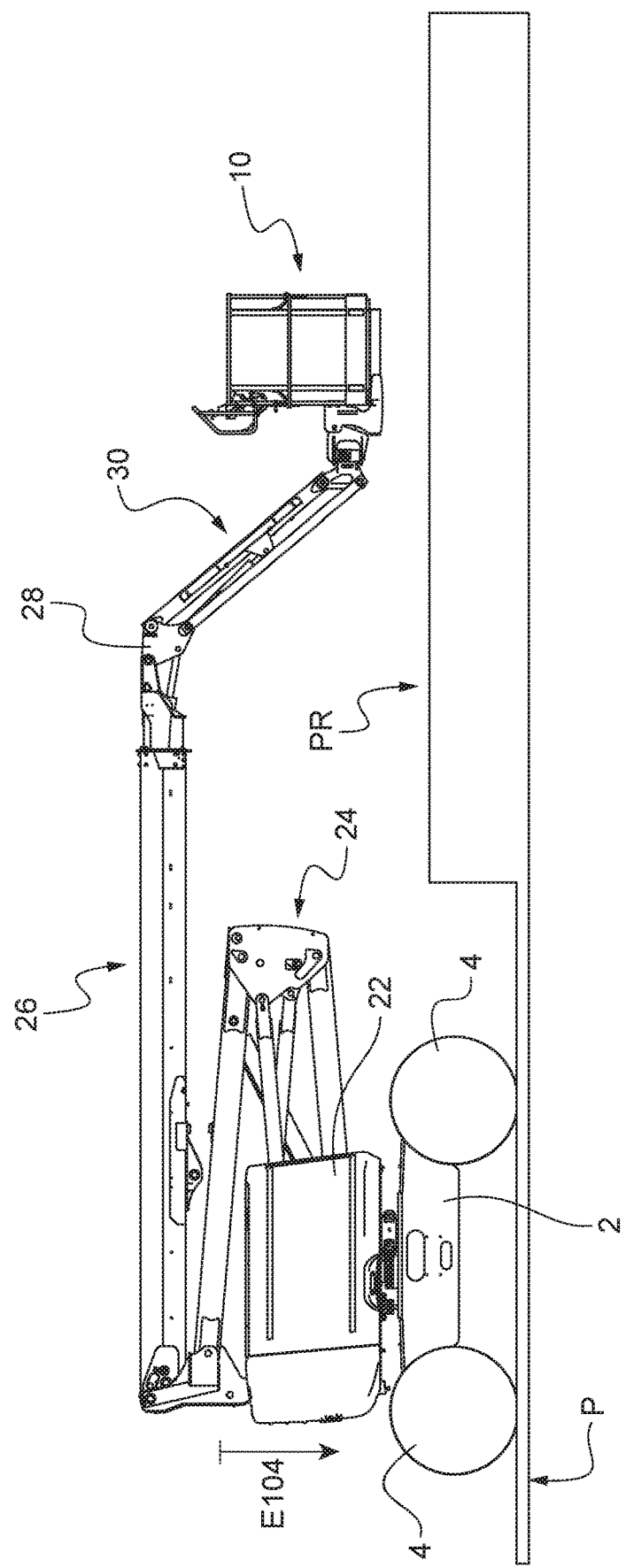

FIG. 9 illustrates an example of starting configuration of the aerial work platform on a gooseneck platform P depicted schematically. The arrow E104 represents the first movement to be executed, namely that of step 104, in other words the lowering of the articulated arm 24 into abutment.

Figure 10:
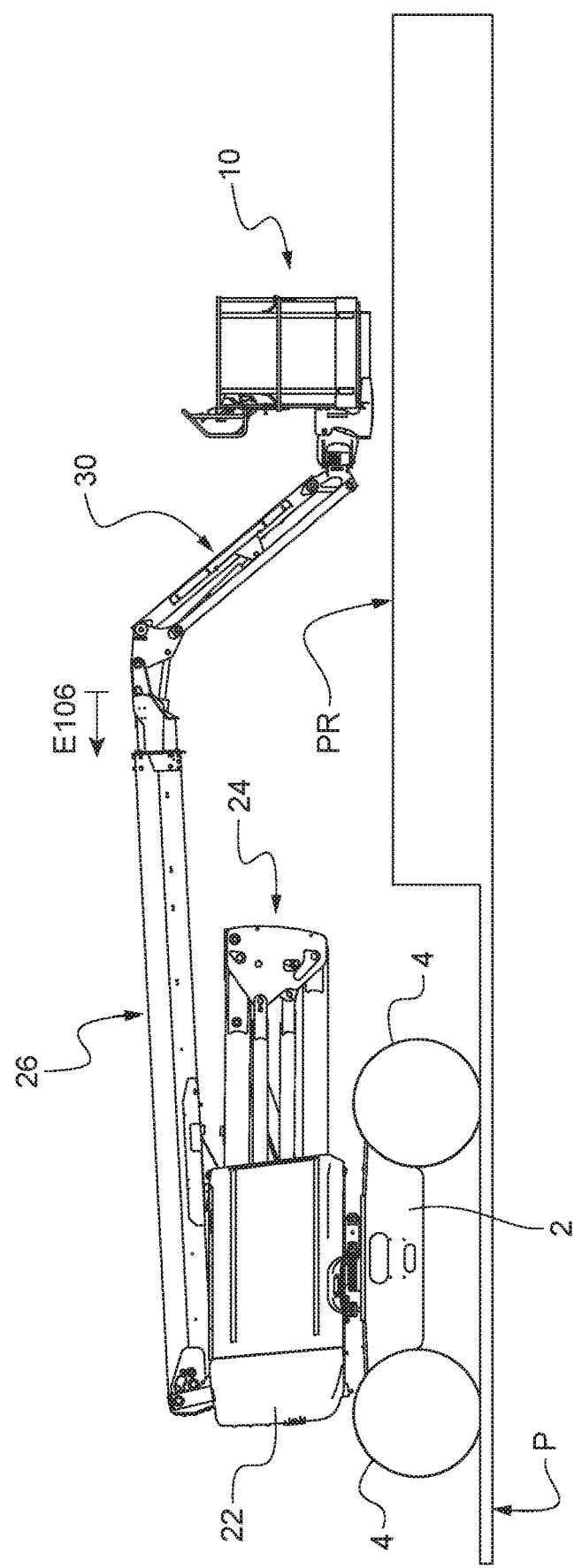

FIG. 10 illustrates the configuration of the aerial work platform after execution of step 104. It will be noted that the boom 26 has been raised a little compared with FIG. 9, which is the consequence of step 206 because the sensor 51 detected the proximity of the raised part PR of the platform P when the articulated arm 24 was lowered.

The arrow E106 represents the following movement to be executed, namely that of step 106, in other words the retraction of the telescopic part of the boom 26 in abutment.

Figure 11:
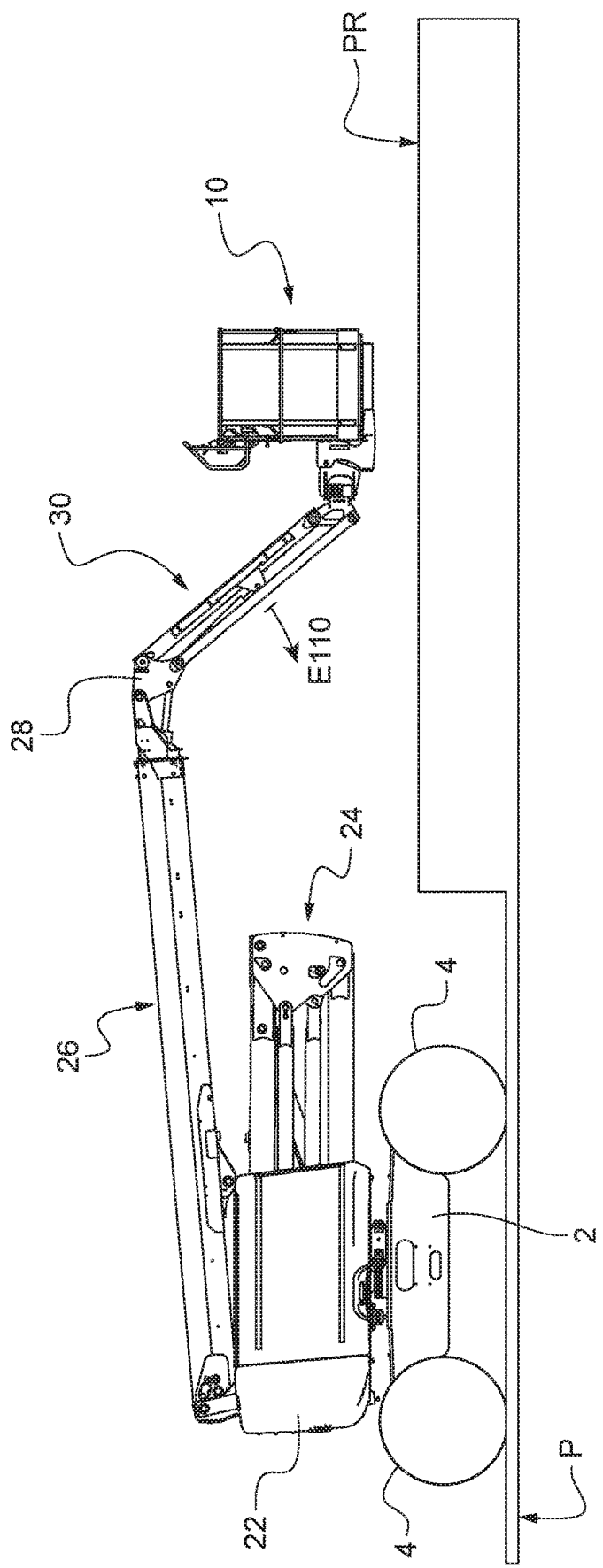

FIG. 11 illustrates the configuration of the aerial work platform after execution of step 106. It will be noted once again that the boom 26 has been raised a little compared with FIG. 10, which is once again the consequence of step 206 because the sensor 51 detected the proximity of the raised part PR of the platform P when the telescopic part of the boom 26 was retracted.

Next, the on-board electronics applies in principle step 108 consisting of centring the platform 10 with respect to the pendular arm 30. In this case, the platform 10 was already centred and therefore the on-board electronics continued with step 110. The arrow E110 in FIG. 11 represents this next movement to be performed, namely the lowering of the pendular arm 30 into abutment.

Figure 12:
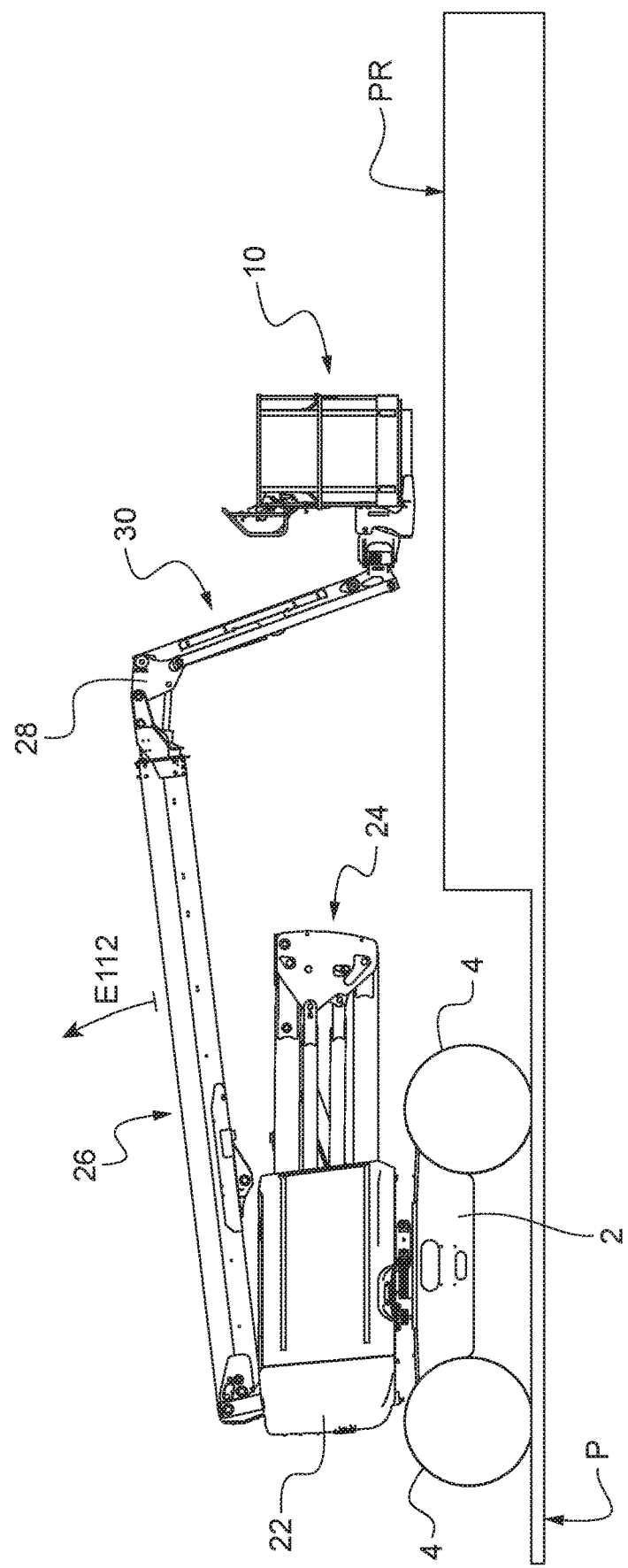

FIG. 12 illustrates the configuration of the aerial work platform after execution of step 110. It will be noted that the boom 26 has again been raised a little with respect to FIG. 11, which is once again the consequence of step 206 because the sensor 51 detected the proximity of the raised part PR of the platform P when the pendular arm 30 was lowered into abutment.

After step 110, the compact-positioning process continues by tilting the platform 10 under the boom 26 and lowering the boom 26 as far as possible while taking account of any obstacles, which is the subject matter of steps 112 to 116. For this purpose, the on-board electronics pivots the support 28 of the system for keeping the platform 10 level so as to fold the pendular arm 30 towards the boom 26, which has the effect of moving the deck 12 of the platform 10 away from the horizontal and to incline it greatly towards the platform P. The on-board electronics controls the pivoting of the support 2 by modifying the distribution of the hydraulic fluid between the two branches of the hydraulic circuit each connecting respective chambers of the jacks 41 and 42, which modifies the length by which the rod of the slave jack 42 is brought out while the length by which the rod of the master jack 41 comes out remains unchanged because of the jack 40 that maintains the inclination of the boom 26 with respect to the connecting support 24c. These steps are defined so as to take into account the fact that the master/slave system for keeping the platform 10 level has the effect of systematically pivoting the support 28 when an inclination movement of the boom 26 is effected.

More precisely, the on-board electronics first executes step 112 consisting of raising the boom 26, preferably for a predetermined time t1. The time t1 is preferably chosen between 2 and 4 seconds, more preferentially approximately 3 seconds. This aims to provide a free height under the platform 10 for executing the following step without striking an obstacle in the vicinity or at least limiting the probability thereof. In the example illustrated, the arrow E112 in FIG. 12 illustrates the raising of the boom 26 to be carried out in application of step 112. FIG. 13 illustrates the configuration of the aerial work platform after execution of step 112.

The on-board electronics next executes step 114, consisting of pivoting the support 28 into abutment so that the pendular arm 30 is placed towards the boom 26, under it. This has the effect of forcing the system for keeping the platform 10 level, the deck 12 of the platform 10 inclining greatly with respect to the horizontal. The arrow E114 in FIG. 13 illustrates the movement to be achieved in application of step 114 while FIG. 14 illustrates the configuration of the aerial work platform after execution thereof.

When step 114 is executed, the on-board electronics implements the logic diagram 200 in FIG. 7, which makes it possible to manage the presence of a possible obstacle in the vicinity of the platform 10 when the support 28 is pivoted. Because of this, it will be understood that the prior step 112 of raising the boom 26 can be omitted.

After step 114, the on-board electronics executes step 116, which aims firstly to lower the boom 26 to the maximum extent while exploiting the maximum possibility of raising of the platform 10 under the boom 26 by pivoting of the support 28 in abutment in the direction of folding of the pendular arm 30 towards the boom 26, under it. It is in fact in this position of abutment of the support 28 that the level of the platform 10 is the highest under the boom 26, which makes it possible to maximise the lowering of the boom 26. Step 116 also aims to put the bottom front edge 12a of the platform 10 in contact with the ground. In implementing step 116, account is taken both of the possible presence of an obstacle in the vicinity of the platform 10 and of the fact that the master/slave system for keeping the platform 10 level pivots the support 24 at the same time as the inclination of the boom 26 is modified without the slave jack 42 being controlled by the on-board electronics.

The detail of the execution of step 116 by the on-board electronics is illustrated by the logic diagram 300 in FIG. 8.

It begins with box 302 and the on-board electronics commences by executing step 304 of checking whether the boom 26 is in bottom abutment.

If such is the case, the on-board electronics passes to the checking step 316 consisting of determining whether the bottom front edge 12a of the platform 10 is in contact with the ground or any object placed on the platform 10 on the basis of the obstacle detection system, in this case the signal from the sensor 52. If such is the case, this means that the aerial work platform is already in the compact transportation position: the on-board electronics has then arrived at the end of the logic diagram 300—cf. box 320—and at the end of the logic diagram 100: cf. box 118. In the contrary case, the on-board electronics executes step 318 consisting of pivoting the support 28 so as to lower the pendular arm 30, and therefore the platform 10, towards the ground and loops onto step 316 as long as the obstacle detection system has not determined that the bottom front edge 12a of the platform 10 has arrived in contact with the ground or an object placed thereon.

If at step 304 the on-board electronics determines that the boom 26 is not in abutment, it passes to the execution of step 306 of checking the presence of an obstacle in the vicinity of the platform 10 by means of the obstacle detection system. In the absence of the detection of an obstacle in the vicinity at step 304, the on-board electronics lowers the boom 26 by applying step 308 and goes to the checking step 304 again. In the contrary case, the on-board electronics stops the lowering of the boom 26 (not shown in the logic diagram 300) and checks whether the support 28 is in abutment in the direction of folding of the pendular arm 30 under the boom 26. If this is not the case, it pivots the support 28 in order to fold the pendular arm 30 towards the boom 26—cf. step 312—going to the checking step 310 again so as to bring the support 28 into abutment in the direction of folding of the pendular arm 30 under the boom 26. The looping of steps 310 and 312 has the effect of raising the lowest part of the platform 10, it being recalled that the lowering of the boom 26 brings the support 28 from its abutment and therefore lowers the level of the platform 10 because of the master/slave system for keeping the platform 10 level.

If at the checking step 310, it appears that the support 28 is in abutment in the direction of folding of the pendular arm 30 under the boom 26, the on-board electronics checks at step 314 whether the bottom front edge 12a of the platform 10 is in contact with the ground or any object under the platform 10 on the basis of the information supplied by the obstacle detection system, in this case the sensor 52. If this is not the case, the on-board electronics goes to step 308 again in order to continue the lowering of the boom. In the contrary case, this means that the aerial work platform is now in the compact transportation position: the on-board electronics has finished executing the logic diagram 300—cf. box 320—and the logic diagram 100: cf. box 118.

By applying the logic diagram 300, the aerial work platform in our illustrative example ends in the compact transportation position as depicted in FIG. 15.

For implementation of the logic diagrams 100, 200, 300, the aerial work platform is provided with respective end-of-travel sensors for detecting when each movement concerned arrives in abutment or alternatively by detecting that a pressure threshold has been exceeded in the hydraulic circuit, which is indicative of the movement concerned arriving in abutment. Similarly, the on-board electronics can determine if the platform 10 is off-centre with respect to the pendular arm 30 by means of an angle sensor or two sensors indicating off-centring towards a respective side.

In the execution of the logic diagrams 100, 200 and 300, the on-board electronics is preferentially designed to consider that the platform 10 is close to an obstacle if the obstacle detection system determines that it is situated at a distance less than or equal to a predetermined distance threshold that is chosen sufficient to stop the current movement of the lifting structure 20 without risk of striking the obstacle under inertial effect. In general, a threshold of 10 cm appears appropriate from this point of view.

As mentioned, the contact of the bottom front edge 12a of the platform with the ground is detected on the basis of the signals from the proximity sensor 52. As a variant, it may be operated by means of a separate device, for example by a device for detecting pressure exerted on a flexible tube arranged along the bottom front edge 12a of the platform 10 or alternatively by detection of the exceeding of a pressure threshold in the hydraulic circuit.

It will be noted that the logic diagrams 100, 200, 300 do not provide any particular orientation of the turret 22 with respect to the chassis 2. This is because it is preferable not to automatically impose any particular orientation thereof and to allow the operator to orient it himself according to the objects already present on the trailer or flatbed lorry.

It will also be noted that the order of steps 104 to 110 may be modified.

Naturally, if the system for keeping the platform 10 level is not of the master/slave type functioning independently of the on-board electronics, the logic diagram 300 can be adapted and simplified.

Moreover, in order to bring the bottom front edge 12a of the platform 10 in contact with the ground in the case where the boom 26 is already lowered into bottom abutment, it is possible to act alternatively or complementarily to the pivoting of the support 28, on the inclination of the pendular arm 30 with respect to the support 28 in the direction of raising thereof.

In the exemplified embodiment, the design of the lifting structure 20 having regard to its possibility of movements excludes any possibility of interference of the platform 10 with another part of the aerial work platform. Because of this, the logic diagrams 100, 200, 300 do not have to manage such a risk of interference. If such were not the case, the logic diagrams 100, 200, 300 are adapted for avoiding such interference on the basis of the obstacle detection system. The obstacle detection system is where applicable adapted for being able to detect the proximity of the platform 10 to the other relevant parts of the aerial work platform as required by supplementing it with one or more additional proximity sensors.

Moreover, the logic diagrams 100, 200, 300 may of course be adapted to different aerial work platforms provided that they have an inclinable boom on a chassis and a pendular arm pivoting at the end of the boom that holds a work platform. They can be adapted in particular to aerial work platforms without an articulated arm 24, or having a non-telescopic boom 26, or one not enabling the platform 10 to pivot with respect to the pendular arm 30. Naturally the logic diagrams 100, 200, 300 may be applied also to the case of aerial work platforms without a turret since the latter is not involved in the logic diagrams.

It should be noted that, in this embodiment of the putting in the compact transportation position, the inclination of the boom 26 serves as an adjustment variable for avoiding the obstacles in the vicinity of the platform 10 during the various movements. One reason for this choice is that it is preferable for the articulated arm 24 to be entirely folded in order to increase the rigidity and strength of the lifting structure 20 in the face of transportation jolts.

The on-board electronics may also be designed to automatically bring the aerial work platform, on request from an operator, into a folded position ready for use from the compact transportation position into which the on-board electronics previously brought it automatically.

For the aerial work platform of the embodiment described up until now, this possibility can be implemented by the on-board electronics by executing the logic diagram 400 in FIG. 16.

From the compact transportation position—cf. box 402—the on-board electronics executes step 404 consisting of raising the articulated arm 24 preferably for a predetermined time t3. This predetermined time t3 is chosen so as to provide ground clearance under the platform 10 that then makes it possible to pivot the support 28 in order to bring the deck 12 of the platform 10 horizontal, which is the purpose of the following step 406. To this end, the time t3 is preferably around 3 seconds. When step 406 is executed, the on-board electronics can determine that the floor 12 has arrived in the horizontal position on the basis of the information supplied by a device for determining the inclination of the floor 12, which may be of any suitable type known per se.

After step 406, the on-board electronics executes step 408 consisting of lowering the articulated arm 24 until it is in bottom abutment. Then the on-board electronics executes step 410 consisting of lowering the boom 26 until it is in bottom abutment.

When the movements of steps 408 and 410 are executed, the on-board electronics checks in real time whether the obstacle detection system is detecting the proximity of the platform 10 to an obstacle. If such is not the case, the on-board electronics continues the movement concerned until abutment. On the other hand, if the obstacle detection system detects the proximity of the platform 10 to an obstacle, the on-board electronics preferably stops the movement concerned, raises the pendular arm 30 in order to avoid the obstacle and then resumes the movement. In other words, the on-board electronics applies an algorithm similar to that in the logic diagram 200 in FIG. 7 but by raising the pendular arm 30 instead of the boom 26 at step 206.

Finally, the on-board electronics executes step 412 consisting of lowering the pendular arm 30 until the proximity of an obstacle—namely in principle the ground—is detected on the basis of the information supplied by the obstacle detection system, in particular the sensor 51, or failing this until bottom abutment.

The process of automatic placing of the aerial work platform in the folded position ready for use is then finished: cf. box 414. The aerial work platform is then in a folded configuration ready for use, the platform 10 being horizontal and close to the ground to allow access on board for persons, as for example illustrated in FIG. 1.

It should be noted that, in this embodiment of the putting in the folded position ready for use, the inclination of the pendular arm serves as an adjustment variable for avoiding obstacles in the vicinity of the platform 10. The reason for this is that, in order to move the aerial work platform on the ground at maximum speed, it is preferable for the articulated arm 24 and the boom 26 to be both in bottom abutment in order to limit the oscillations applied to the platform 10. Further, in order to join a working area, the operators generally raise only the pendular arm 30, which improves visibility from the platform 10 towards the front of the aerial work platform, that is to say in the direction of forward movement thereof, which in this case goes from right to left in FIG. 1.

A man/machine interface is provided to enable the operator to request the automatic placing of the aerial work platform in the compact transportation position or the automatic placing in the folded position ready for use from it. The interface is designed to receive a corresponding command from the operator for requesting each. These commands may be made accessible in various ways: on an auxiliary control station arranged on the chassis 2 or the turret 22 so as to be accessible from the ground and equipped moreover with other control members dedicated to the manual control of the various movements of the lifting structure 20, or on a separate station arranged on the chassis 2 or the turret so as to be accessible from the ground. It may also be a remote control. The control station may comprise a graphical screen, either a touch screen, or one provided with buttons with generic functions such as movement on the screen, validation and cancellation. The control station may in particular consist of a mobile terminal provided with a screen and executing a dedicated application, in particular a smartphone.

In the case of a graphical screen, the commands for the function of putting in the compact transportation position are preferably displayed on a dedicated page that is selected by the user, given that this is not the main function of the aerial work platform. The default display may comprise generic information such as hour meter, time, fuel level, safety alerts, etc.

If the user cuts off the power supply to the aerial work platform after automatic placing in the compact transportation position, it is advantageous for the menu for putting in the folded position ready for use to be displayed first when the aerial work platform is once again powered up to enable the user to instruct it without waiting.

The screen can advantageously display a bar graph that shows in real time the progress with the automatic manoeuvre both of the automatic placing in the compact transportation position and the automatic placing in the folded position ready for use. At the end of the sequence of putting in the compact transportation position, it is advantageous to display on the graphical screen instructions for securing the aerial work platform during transportation: engaging a device for locking the ring of the turret 22 to prevent its breaking or turning during transportation, chaining the aerial work platform to the trailer, etc.

Advantageously, the lifting structure 20 of the aerial work platform may be equipped with a camera, the video signal of which is displayed on part of the graphical screen. Thus, the user can check that the automatic manoeuvre of putting in the compact transportation position is progressing correctly and interrupt it if necessary.

For safety reasons, it is preferable for the command for ordering the automatic placing in the compact transportation position or in the folded position ready for use—or optionally another dedicated member—to have to be maintained activated by the operator throughout the duration of execution of a corresponding automatic process and that, in the event of release of the command or of the dedicated member, the on-board electronics immediately suspends the automatic process as long as the command or the dedicated member is not once again activated. This feature also has the advantage of enabling the operator to intervene on the current operations by manually actuating movements of the lifting structure 20.

Naturally the present invention is not limited to the examples and embodiment described and depicted but is capable of numerous variants accessible to a person skilled in the art.

The invention claimed is:

1. An aerial lift assembly able to be transported on a trailer or flatbed lorry, comprising:
   a chassis provided with members for translation on a ground,
   a work platform comprising a deck and a guardrail,
   a lifting structure arranged on the chassis and comprising:
      a boom able to be raised and lowered by modifying an inclination thereof with respect to the chassis, and
      a pendular arm mounted by a first end on a top end of the boom so as to be able to be raised and lowered with respect to the boom by pivoting the pendular arm with respect to the boom, the pendular arm supporting the work platform at a second end of the pendular arm, opposite to the first end of the pendular arm,
   an obstacle detection system arranged to detect that the work platform is in proximity to an obstacle; and
   on-board electronics designed to execute at a request of an operator a process which when executed by the on-board electronics, causes the on-board electronics to control the lifting structure so as to automatically place the aerial lift assembly in a compact position in which the aerial lift assembly is suitable for transport on the trailer or flatbed lorry, wherein the process when executed by the on-board electronics, causes the on-board electronics to control the lifting structure according to detection information supplied by the obstacle detection system so as to avoid that the work platform strikes the obstacle.

2. The aerial lift assembly according to claim 1, wherein the obstacle detection system comprises at least one proximity sensor arranged to detect the obstacle in proximity under the deck of the work platform or in front of a front side of the work platform that is opposite to the pendular arm.

3. The aerial lift assembly according to claim 1, wherein the process when executed by the on-board electronics causes the on-board electronics to control the lifting structure so that, in the compact position, the pendular arm is folded under the boom and the deck of the work platform is inclined with respect to the ground so that a bottom front edge of the work platform is directed towards the ground and in contact therewith, the process when executed by the on-board electronics causing the on-board electronics to bring the bottom front edge of the work platform in contact with the ground by maximizing a lowering of the top end of the boom.

4. The aerial lift assembly according to claim 1, wherein:
   the obstacle detection system comprises at least one proximity sensor arranged to detect that the obstacle is in proximity under the deck of the work platform as well as to detect that the obstacle is in proximity in front of a front side of the work platform that is opposite to the pendular arm; and
   the process when executed by the on-board electronics causes the on-board electronics to control the lifting structure so that, in the compact position, the pendular arm is folded under the boom and the deck of the work platform is inclined with respect to the ground so that a bottom front edge of the work platform is directed towards the ground and in contact therewith, the process when executed by the on-board electronics causing the on-board electronics to bring the bottom front edge of the deck in contact with the ground by maximizing a lowering of the top end of the boom.

5. The aerial lift assembly according to claim 1, wherein:
   the boom is telescopic, and
   the process when executed by the on-board electronics causes the on-board electronics to control the lifting structure so that, in the compact position, the boom is completely retracted.

6. The aerial lift assembly according to claim 5, wherein:
   the work platform is able to be pivoted about a vertical axis with respect to the pendular arm, and
   the process when executed by the on-board electronics causes the on-board electronics to control the lifting structure so that, in the compact position, the work platform is centered with respect to the pendular arm.

7. The aerial lift assembly according to claim 5, wherein:
   the boom is mounted on the chassis by means of an articulated arm, the articulated arm supporting the boom at a top end of the articulated arm,
   the boom is able to be raised and lowered by modifying the inclination of the boom with respect to the articulated arm, and
   the top end of the articulated arm is able to be raised and lowered vertically by respectively unfolding and folding the articulated arm, and
   the process when executed by the on-board electronics causes the on-board electronics to control the lifting structure so that, in the compact position, the articulated arm is completely lowered.

8. The aerial lift assembly according to claim 1, wherein the process when executed by the on-board electronics causes the on-board electronics to control the lifting structure so as to raise the top end of the boom if the obstacle detection system detects that the work platform is in proximity of the obstacle when the on-board electronics is putting the aerial lift assembly in the compact position.

9. The aerial lift assembly according to claim 1, wherein the process when executed by the on-board electronics causes the on-board electronics to raise the boom if the obstacle detection system detects that the work platform is in proximity of the obstacle when the on-board electronics is putting the aerial lift assembly in the compact position.

10. The aerial lift assembly according to claim 9, wherein the process when executed by the on-board electronics causes the on-board electronics to raise the boom for a predetermined period if the obstacle detection system detects that the work platform is in proximity of the obstacle.

11. The aerial lift assembly according to claim 1, wherein the process when executed by the on-board electronics causes the on-board electronics to stop a current movement or movements of the lifting structure when the obstacle detection system detects that the work platform is in proximity of the obstacle.

12. The aerial lift assembly according to claim 1, wherein:
the pendular arm is mounted at the top end of the boom by means of a support, the pendular arm being mounted by the first end on the support so as to be able to be raised and lowered by pivoting the pendular arm with respect to the support and the support being mounted so as to pivot about a horizontal axis at the top end of the boom, the support forming part of a system for keeping the work platform level in order to keep the deck of the work platform substantially horizontal by pivoting the support when the inclination of the boom with respect to the chassis is modified when the aerial lift assembly is in use,
the on-board electronics are configured to cause the support to pivot;
the system for keeping the work platform level is designed to pivot the support in correlation with a modification of the inclination of the boom autonomously with respect the on-board electronics causing the support to pivot, and
the process when executed by the on-board electronics causes the on-board electronics to automatically bring the aerial lift assembly into the compact position in two successive phases which correspond to a first phase followed by a second phase, wherein:
in the first phase the on-board electronics controls the lifting structure so as to ensure, at an end of the first phase, that the support is pivoted such that the pendular arm is folded under the boom and that the lifting structure is in a configuration corresponding to the compact position of the aerial lift assembly, except:
with regard to the angle of inclination of the boom and optionally an angle of pivoting of the support of the system for keeping the work platform level, and
in that a bottom front edge of the work platform is out of contact with the ground, and
in the second phase in which the on-board electronics causes the inclination of the boom to be modified, the support to pivot and optionally the pendular arm to raise with respect to the support so as, at an end of the second phase, to result in the compact position of the aerial lift assembly,
wherein:
during the second phase, the on-board electronics apply:
a first sequence consisting of:
i) lowering the boom, and
ii) if the obstacle detection system detects that the work platform is in proximity of the obstacle, stopping lowering the boom and pivoting the support in order to fold the pendular arm towards the boom, and then lowering the boom if the obstacle detection system has ceased to detect that the work platform is in proximity of the obstacle, and if the boom has been lowered until it is in bottom abutment during said first sequence, the on-board electronics applies after the first sequence a second sequence for bringing the bottom front edge of the work platform in contact with the ground by carrying out at least one of the following:
pivoting the support so as to move the pendular arm away from the boom, and
raising the pendular arm with respect to the support.

13. The aerial lift assembly according to claim 12, wherein:
the lifting structure is configured with regard to its possibilities of movement so as to exclude any possibility of interference of the work platform with another part of the aerial lift assembly, and
the process when executed by the on-board electronics causes the on-board electronics to carry out at least one of the following:
when pivoting the support in step (ii) of the first sequence of the second phase, the on-board electronics pivots the support until it is in abutment, and
the on-board electronics pivots the support so that the support is in abutment at the end of the first phase.

14. The aerial lift assembly according to claim 12, wherein during the first phase, the process when executed by the on-board electronics causes the on-board electronics to control the lifting structure so as to raise the top end of the boom if the obstacle detection system detects that the work platform is in proximity of the obstacle.

15. The aerial lift assembly according to claim 12, wherein during the first phase, the process when executed by the on-board electronics causes the on-board electronics to raise the boom if the obstacle detection system detects that the work platform is in proximity of the obstacle.

16. The aerial lift assembly according to claim 15, wherein during the first phase, the process when executed by the on-board electronics causes the on-board electronics to raise the boom for a predetermined period if the obstacle detection system detects that the work platform is in proximity of the obstacle.

17. The aerial lift assembly according to claim 15, wherein when the obstacle detection system detects that the work platform is in proximity of the obstacle during the first phase, the process when executed by the on-board electronics causes the on-board electronics to stop a current movement or movements of the lifting structure, to raise the boom and then to resume the current movement or movements after having raised the boom if the obstacle detection system has ceased to detect that the work platform is in proximity of the obstacle.

18. The aerial lift assembly according to claim 1, wherein the process when executed by the on-board electronics causes the on-board electronics before automatically putting the aerial lift assembly into the compact position to check at least one of:
an absence of a load or a person on board the work platform by cooperating with a load measuring system present on the work platform or a system, and
an absence of any person on board the work platform by cooperating with a system for detecting that a harness for any person on board the work platform is attached.

* * * * *